(12) United States Patent
Gompers et al.

(10) Patent No.: US 7,426,488 B1
(45) Date of Patent: Sep. 16, 2008

(54) PRIVATE EQUITY INVESTMENTS

(76) Inventors: Paul A. Gompers, 156 Mason Ter., Brookline, MA (US) 02446; Joshua Lerner, 108 Moulton St., South Hamilton, MA (US) 01982; Andrew Metrick, 604 Schiller Ave., Merion Station, PA (US) 19066; Leslie Ann Jeng, 32 River St., Cambridge, MA (US) 02139

( * ) Notice: Subject to any disclaimer, the term of this patent is extended or adjusted under 35 U.S.C. 154(b) by 1333 days.

(21) Appl. No.: 09/990,893

(22) Filed: Nov. 14, 2001

Related U.S. Application Data

(60) Provisional application No. 60/248,272, filed on Nov. 14, 2000.

(51) Int. Cl.
*G06Q 40/00* (2006.01)

(52) U.S. Cl. ........................... 705/36 R; 705/35

(58) Field of Classification Search ............... 705/36 R, 705/35–45, 30, 33; 707/202, 1–10
See application file for complete search history.

(56) References Cited

U.S. PATENT DOCUMENTS 5,220,500 A * 6/1993 Baird et al. ................ 705/36 R
5,812,987 A * 9/1998 Luskin et al. .............. 705/36 R

OTHER PUBLICATIONS

Madura, Jeff—Book "financial Markets and Institutions" second edition, Florida Atlantic University, West Publishing Company, 1992, ISBN: 0-314-87735-5.*

Gompers, Paul A., et al., Risk and Reward in Private Equity Investments: The Challenge of Performance Assessment. The Journal of Private Equity, Winter, 1997.

Lerner, Josh, et al., Yale University Investments Office: Nov. 1997, Harvard Business School, Rev. Sep. 28, 1998, p. 1-25, Harvard Business School Publishing, Boston, MA.

Armstrong, Elissa, Private Equity—The New Asset Class, Highlights of the London Business School Report "UK Venture Capital and Private Equity as an Asset Class for Institutional Investors", BVCA, London, England.

Long, Austin M., III, Converting IRRs to Time-Weighted Returns, IQ Markets, Inc., www.iq markets.com, Sep. 8, 2000.

Huntsman, Blaine, et al., Investment in New Enterprise: Some Empirical Observations on Risk, Return, and Market Structure, Huntsman and Hoban/Investment in New Enterprise, Summer, 1980, p. 44-50.

Gardner, Grant, et al., Private Equity in Asset Allocation, Russell, Sep. 1995, p. 1-10.

(Continued)

*Primary Examiner*—Mary Cheung
*Assistant Examiner*—Kirsten S Apple
(74) *Attorney, Agent, or Firm*—Foley Hoag LLP

(57) ABSTRACT

In general, in one aspect, the disclosure describes a computer program for analyzing private equity investments. The program includes instructions that access public equity data identifying performance of a set of more than one public equities. The instructions also access private equity data identifying one or more characteristics of different private equity investments. The program analyzes a private equity investment based, at least in part, on the public equity data and the private equity data of other private equity investments.

37 Claims, 6 Drawing Sheets

OTHER PUBLICATIONS

Venture Economics Information Services, 1998 Investment Benchmarks Report: Venture Capital 1998, p. 1-46, Newark, NJ.
Harrell, David, How to Use Beta, Morningstar.com., 2000.
Harrell, David, How Alpha Works, Morningstar.com, 2000.
It's a Risky Business, Part 1: Measuring Private Equity Risk, www.iqmarkets.com, Sep. 6, 2000.
It's Risky Business, Part 2: Two Perspectives: *Austin Long* vs. *Lemer/Compers*, www.iqmarkets.com, Sep. 5, 2000.

* cited by examiner

FIG. 2

PRIVATE EQUITY INVESTMENTS

REFERENCE TO RELATED APPLICATIONS

This relates to co-pending U.S. Provisional Application Ser. No. 60/248,272, entitled "Private Equity Valuation", and filed Nov. 14, 2000. This application is incorporated by reference herein in its entirety.

BACKGROUND

Private-equity financing generally occurs in rounds. A round generally features a sale of some portion of a company. For example, in a first round of financing, a start-up company may sell 10% of the ownership in the company in exchange for $50,000. Immediately, after such a transaction, most would agree the start-up company has a value of $500,000. That is, if 10% is worth $50,000, then 100% should be worth $500,000. Some time later, the start-up may sell another 10% for $60,000 resulting in a new valuation of $600,000. Such financing rounds may continue until an exit round such as an IPO (Initial Public offering) or sale to a private venture.

Financing rounds may be months or even years apart. This poses a question. What is the value of a private equity investment between rounds? Many investment firms take a conservative approach and value a private equity investment based on the price of the most recent round of financing. Such firms would value the start-up at $500,000 during the time period between the first and second rounds even though this value becomes increasingly stale. Other investment firms value their outstanding investments more aggressively. As a result, valuations of private equity investments between financing rounds may be unreliable both across time, because of difficulty in gauging the value of a private equity investment between rounds, and across investment firms, because of different methods of valuing private equities. These differences can make it difficult to accurately monitor a portfolio, analyze risk, and benchmark the performance of private equity investments.

SUMMARY

In general, in one aspect, the disclosure describes a computer program for analyzing private equity investments. The program includes instructions that access public equity data identifying performance of a set of more than one public equities. The instructions also access private equity data identifying one or more characteristics of different private equity investments. The program analyzes a private equity investment based, at least in part, on the public equity data and the private equity data of other private equity investments.

In general, in another aspect, the disclosure describes a computer-implemented method of analyzing a private equity investment. The method includes accessing data indicating a period of time after a financing round for a private equity investment and determining a depreciation value based, at least in part, on the determined period.

In general, in another aspect, the disclosure describes a computer-implemented method of analyzing a private equity investment. The method includes accessing a value derived, at least in part, from a comparison of a number of private equity investments advancing to one or more specified financing rounds in a first time period to a number of private equity investments advancing to one or more specified financing rounds in a second time period.

In general, in another aspect, the disclosure describes a computer-implemented method of analyzing a private equity investment. The method includes accessing a value derived, at least in part, from data specifying a first valuation for a private equity investment and data specifying a second, different valuation of the private equity investment.

BRIEF DESCRIPTION OF THE DRAWINGS

FIG. 2 is a flow-diagram illustrating generation of a depreciation index.

DETAILED DESCRIPTION

I. Introduction

Between financing rounds, investors often lack direct evidence of a company's value. However, while a particular company may be between rounds, other private equities continue to receive new rounds of financing, adding to a growing body of historical transaction data. Analyzing the financing of other private equity investments in the past and/or present can yield inferences about the behavior of a particular private equity investment and the behavior of private equities as a whole. These inferences can be quantified and used to determine a valuation or "mark-to-market" a given private equity investment, even in the absence of a recent financing round.

Described herein are a variety of techniques that can use private-equity market data to determine and adjust valuations of private equity investments. These valuations may be used in a wide variety of applications such as risk management, benchmarking, and so forth. Broadly, these techniques can be broken down into "microvaluation", which use investment-specific information to quantify an investment's performance relative to other private equities, and "macrovaluation", which gauges characteristics of a group of private equities. Below, we describe the background and motivation of these techniques, along with examples of how each could be implemented. A complete sample implementation is provided in Appendix A which will also be submitted as microfiche.

II. Microvaluation

To see how funding information can impact valuation, consider an analogy to the sale of apples in a supermarket. If all the apples are displayed in a public area for sale, then customers will pick through this display for the best apples. As the day goes on, employees of the store continually restock the display. Suppose that you want to find a good apple but are not allowed to look at the display: instead, you must choose apples based only on the duration they have been in the display. In this situation, it would be good to avoid the apples that had been out the longest, since good apples tend to be chosen quickly, and the ones still left after a long time are likely to be bad.

Figure 1:
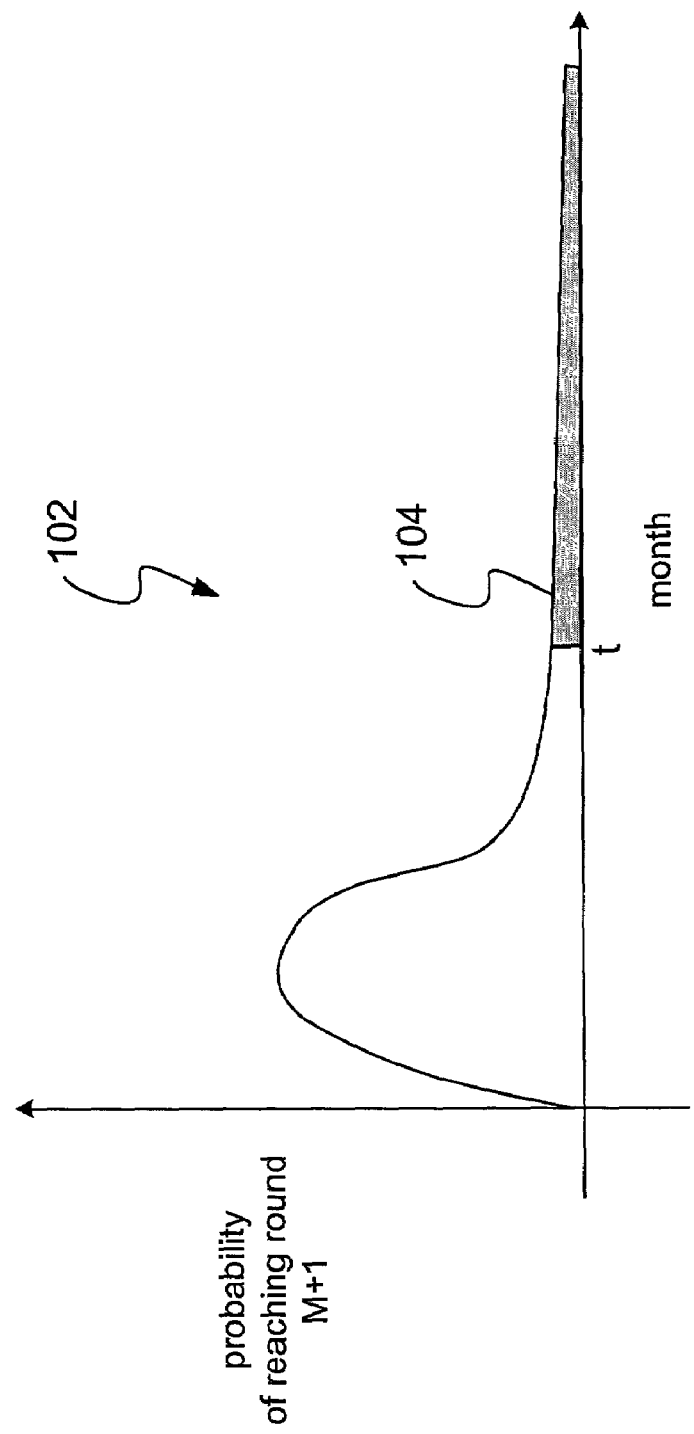
FIG. 1 is a diagram illustrating depreciation of a private equity investment.

In general, the same principle applies to private equity investments. Those investments with the best prospects tend to go through faster funding cycles and are sold (whether to the public or to a strategic buyer) more rapidly. For every period that goes by in which a company does not receive another round of funding, the probability that the company will ever receive such a round falls. FIG. 1 illustrates this concept with a graph 102 depicting the probability of advancing to a next round of financing (round M+1) in a given month as determined by an analysis of historical private market data. By time t, a company that has not advanced to the next round has a slim chance (shaded portion 104) of ever advancing.

The probability loss experienced in a given time period represents a depreciation of that private company. Using this logic, we can determine a "depreciation index" or function that can be applied to a private equity investment based on the amount of time that has elapsed since the previous round. For example, a determined depreciation can be used to adjust an investment valuation based on how long a private equity investment is taking to advance to a subsequent financing round relative to the time other private equity investments took to do so.

As an example of a depreciation calculation, let p(t) be the probability that round M+1 financing occurs exactly t months after round M financing. Let P(t) be the total probability of all round M+1 financings that occur after month t: P(t)=Σp(s), s>t (e.g., the shaded area 104 of FIG. 1). Thus, between t−n months and t months after round M, an investment depreciates by P(t)/P(t−n), where n is the time period over which depreciation is measured.

Figure 2:
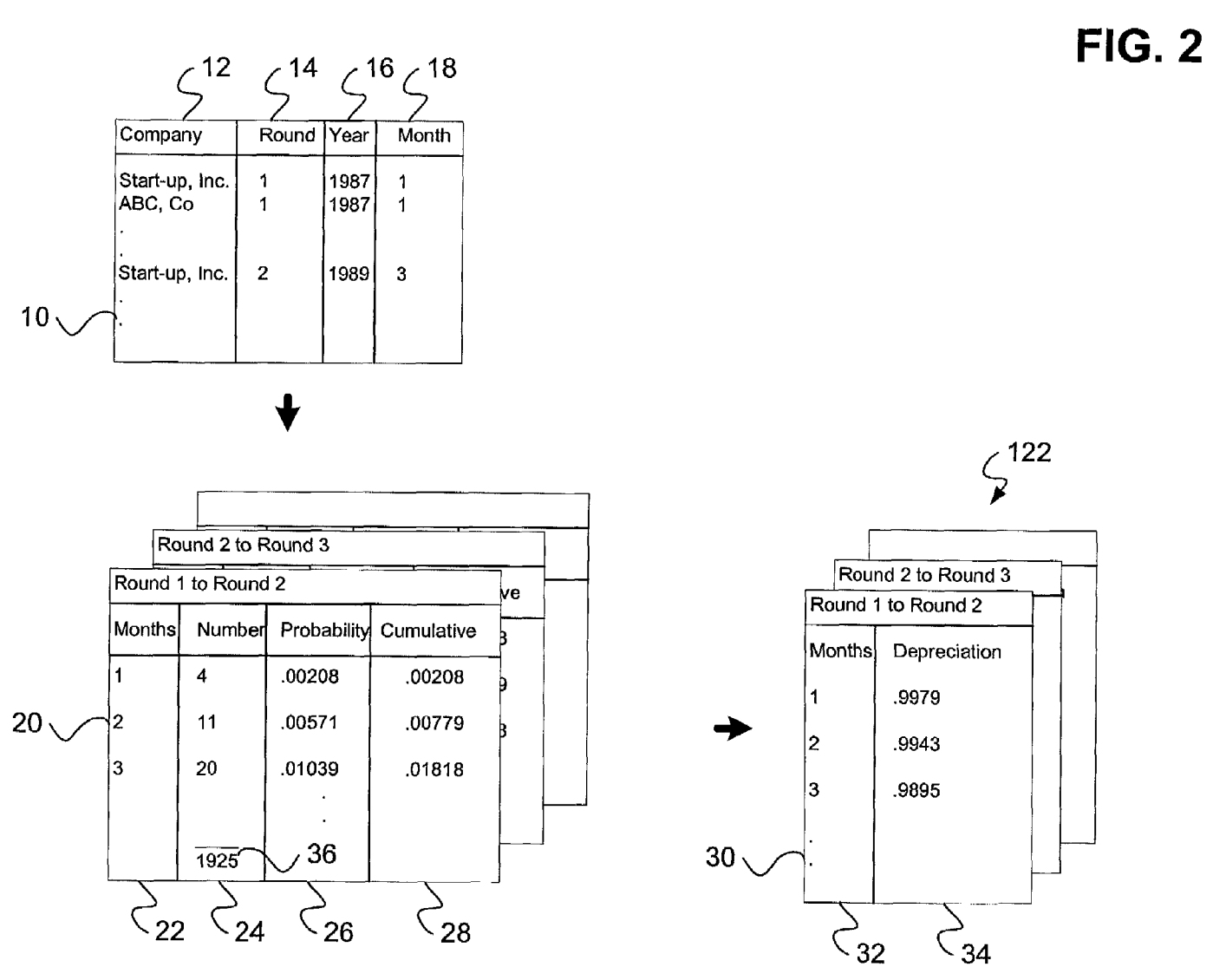

FIG. 2 illustrates an example of generation of a depreciation index 122. As shown, a set of data 10 identifies the timing 16, 18 of different rounds 14 of financing for different companies 12. This data 10 can be used to tabulate the historical distribution of the number of months required to advance to a particular round. For example, a set of data 20 identifies the number of companies 24 advancing from a first to second round of financing in a given month 22. For instance, four 24 companies advanced to the second round in month 22 "1", while eleven 24 companies did so in month 22 "2". Based on the total number of companies advancing to round two in all months (i.e., 1925 36), the probability of reaching round two in a month can be computed as Probability$_{month}$=(Number Advancing to Round Two$_{month}$)/(Total Advancing). In other words, the probability of reaching round two in month "1" is 4/1925 or 0.00208.

As shown, the set of data 20 also includes a cumulative probability 28 of reaching the next round by a given month. Mathematically, the cumulative probability 28 is computed as:

$$\text{Cumulative}_{month} = \sum_{t=1}^{month} \text{probability}_t.$$

For example, the cumulative probability (0.00779) of reaching the second round of financing by month "2", is the probability of reaching the second round of financing in month "1" (0.00208) plus the probability of reaching the second round of financing in month "2" (0.00571).

A depreciation value that measures the incremental depreciation suffered by a company after another month elapses without reaching the next round of financing may be defined as:

$$\text{Depreciation}_{month} = \frac{(1 - \text{Cumulative}_{month})}{(1 - \text{Cumulative}_{month-1})}.$$

As shown, a depreciation index 122 includes these depreciation values 34 for different months and for different rounds of financing. Thus, the depreciation index 122 can provide an incremental depreciation value for a given company between rounds M and M+1, t months after reaching month M by a simple table lookup.

As an example, if a company valued at $500,000 after the first round failed to reach the second round after 1 month, the company valuation could be adjusted by the depreciation index for month 1 after round 1 (i.e., $500,000*0.9979 or $498,950). If the company still failed to advance after two months the companies valuation could be adjusted yet again (i.e., $498,950*0.9943 or $496,105).

The depreciation index described above is merely an example of a technique for characterizing depreciation. Other metrics and functions can capture depreciation. For example, another implementation can estimate a functional form for the depreciation index instead of relying on the exact empirical relationship. For index, a lognormal relationship between the number of months and the probability can be estimated and then used to populate or replace the depreciation index.

III. Macrovaluation

Microvaluation compares the performance of a private equity investment relative to the performance of other private equities. However, price relevant information can also be gleaned based on the collective behavior of private equities. That is, when private equities as a whole behave in a certain way, this behavior can have a predictable affect on the behavior of a particular private equity investment.

As an example, the demand for private equity investments can change over time. For instance, in the late 1990s private equity investments enjoyed great liquidity. That is, private equity investments had better chances of advancing to later rounds of financing. Thus, arguably, during such periods, private equity investments may merit higher valuations.

Indices and functions can reflect these and other "macro" changes in the private equity marketplace over time. For example, a liquidity index may determine a metric that gauges the relative success of companies advancing to a given round of financing at different times.

As an example, a liquidity index may be determined as follows. For each time period t (monthly, quarterly, etc. . . . ), add up the number of firms, N, that reach round M of funding within that time period. A liquidity index value for period t and round M can then be computed as the ratio of round M financings in period t to round M−1 financings in any previous period or set of periods: e.g., N(M,t)/{N(M−1,t−s)+(N(M−1,t−s−1)+(N(M−1,t−s−2)+ . . . (N(M−1,t−r)} for r>s>0. Thus, the liquidity index measures the ratio of the number of companies eligible for a next round in one period to the number of companies that complete that round in another period. S and r may be selected to reflect a reasonable pool of candidates for advancing to round M at time t.

Figure 3:
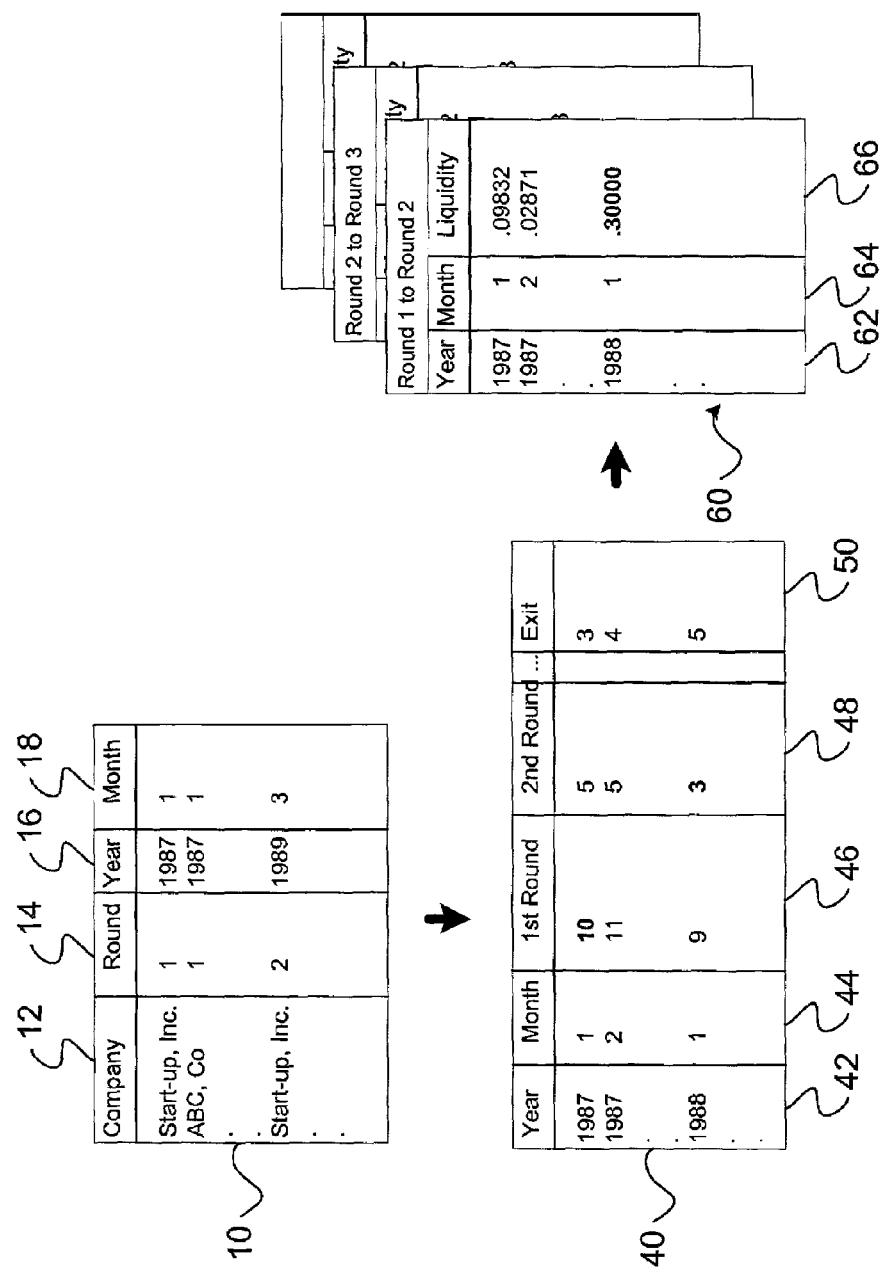
FIG. 3 is a flow-diagram illustrating generation of a liquidity index.

FIG. 3 illustrates generation of a liquidity index 60. Like the depreciation index, the liquidity index 60 is based on data 10 identifying the timing 16, 18, of a particular round 14 of financing of a company 12. Based on the financing data 10, a program can create a distribution 40 of round financings for different time periods. For example, in January (month "1") of 1987 ten companies received a first round 46 of financing; five received a second round 48; and three received an "exit" round 50. As indicated by ellipses in FIG. 3, there is no limit to the number of rounds of financing a company may receive.

Comparing these distributions over time can yield an index roughly measuring the success of private equity investments in reaching further rounds. For example, the liquidity index 60 shown FIG. 3 was computed by a comparison of the number of second round financings in a given month to the number of first round financings one year before. For instance, the liquidity index value (0.3000) 66 for January 64 of 1988 62 is the number of second round companies in January 1988 (3) divided by the number of first round companies in January 1987 (10). Or in terms of the liquidity equations presented above, M=2, and s and r=12 months. Other selections of M, s, and r can produce other liquidity values.

As shown, liquidity values 66 may be determined both for different time periods 62, 64 and for advancement to different rounds. Like the depreciation values, liquidity values may be used to determine or adjust a valuation by a simple lookup into the liquidity index 60 keyed by a specified round and time period 62, 64.

Other macrovaluation techniques can use other information to improve private equity valuation accuracy. For example, a valuation index may compare differently computed valuations. For instance, an index can be constructed from a comparison of valuations directly derived from financing rounds with a valuation adjusted to reflect public equity activity. Such a comparison can quantify changing investor preferences between private and public equities.

Figure 4:
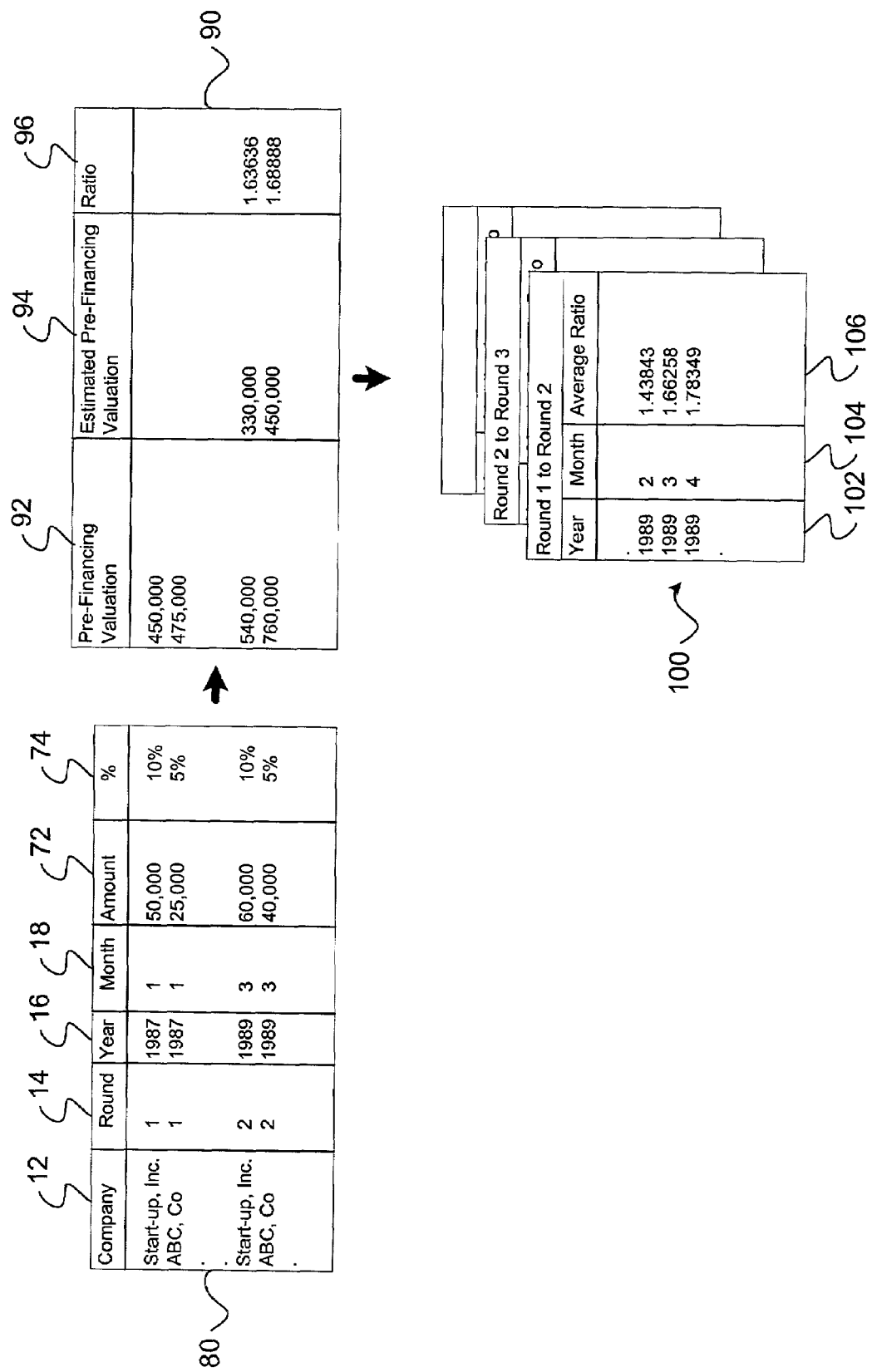
FIG. 4 is a flow-diagram illustrating generation of a valuation index.

As an example, FIG. 4 illustrates generation of a valuation index 100. As shown, data 80 identifies the details of financing rounds 14 for different companies 12. The details include the timing 16, 18 and amount 72 of financing. The data 80 also includes the ownership interest 74 purchased.

Different private equity valuations and characteristics can be derived 90 from this data 80. For example, a program can determine a "Pre-Financing Valuation" 94. Again, at the time of a round of financing, many would agree the value of a company is defined as (Amount of financing)/(% of company bought). For example, the valuation of Start-up, Inc after their second round of financing in March of 1989 would be $60,000/10% or $600,000. A "Pre-Financing Valuation" 92 could be defined as the: financing valuation—the amount invested. To continue the Start-up, Inc. example, the pre-financing valuation would be $600,000−$60,000 or $540,000.

As shown in FIG. 4, the valuation 92 can be compared to another valuation derived using a different methodology. For example, the other valuation 94 may be a valuation adjusted by a benchmark of comparable public firms as described in Gomper's and Lerner's 1997 paper entitled "Risk and Reward in Private Equity Investments: The Challenge of Performance Assessment", incorporated by reference in its entirety herein. An alternate method of computing a valuation applies publicly traded multiples to a private company. For example, if a private company has reported revenues of $5 million in 1997 and the average ratio of market value to revenue in this company's industry at the end of 1997 is 4 to 1, applying this multiple to $5 million yields a valuation of $20 million. Other accounting multiples may be used such as the price-to-earnings ratio, the price-to-book ratio, the price-to-EBIT ratio, the price-to-EBITDA ratio, price-to-employees ratio or other combinations of these. Furthermore, we can adjust the returns both here and later to take account of different leverage (debt-to-equity) ratios between the firm and its comparables.

Again, comparing different valuations over time can yield price relevant information. For example, a ratio 96 comparing the "Pre-financing Valuation" 92 with a "marked-to-market" valuation 94 for the second round financing of Start-up, Inc, would be $540,000/$330,000 or 1.63636. The ratio 96 shown, thus, represents how well a particular investment outperforms a valuation based on public equity performance. When private equity investments enjoy greater demand than public equities, the average ratio should increase. Thus, the ratio 96 can reflect increased interest in private equity investments and argues for a higher valuation of a given private equity investment. Comparisons of other valuations can reveal other investor or market trends.

As shown in FIG. 4, a valuation index 100 can list the average valuation ratio 106 for a given period of time. For example, assuming Start-up, Inc and ABC, Co. constituted all private companies advancing to a second round of financing in March of 1989, the average ratio would be (1.63636+ 1.6888)/2 or 1.66258. The valuation index 100 can feature such values for different periods of time and for different rounds.

IV. Private Equity Valuation

The indices described above can be used to determine or adjust a valuation of a private equity investment. The different indices, however, may vary in their valuation relevance at different times. Thus, a valuation formula may adjust application of index values based on a measure of their significance.

Figure 5:
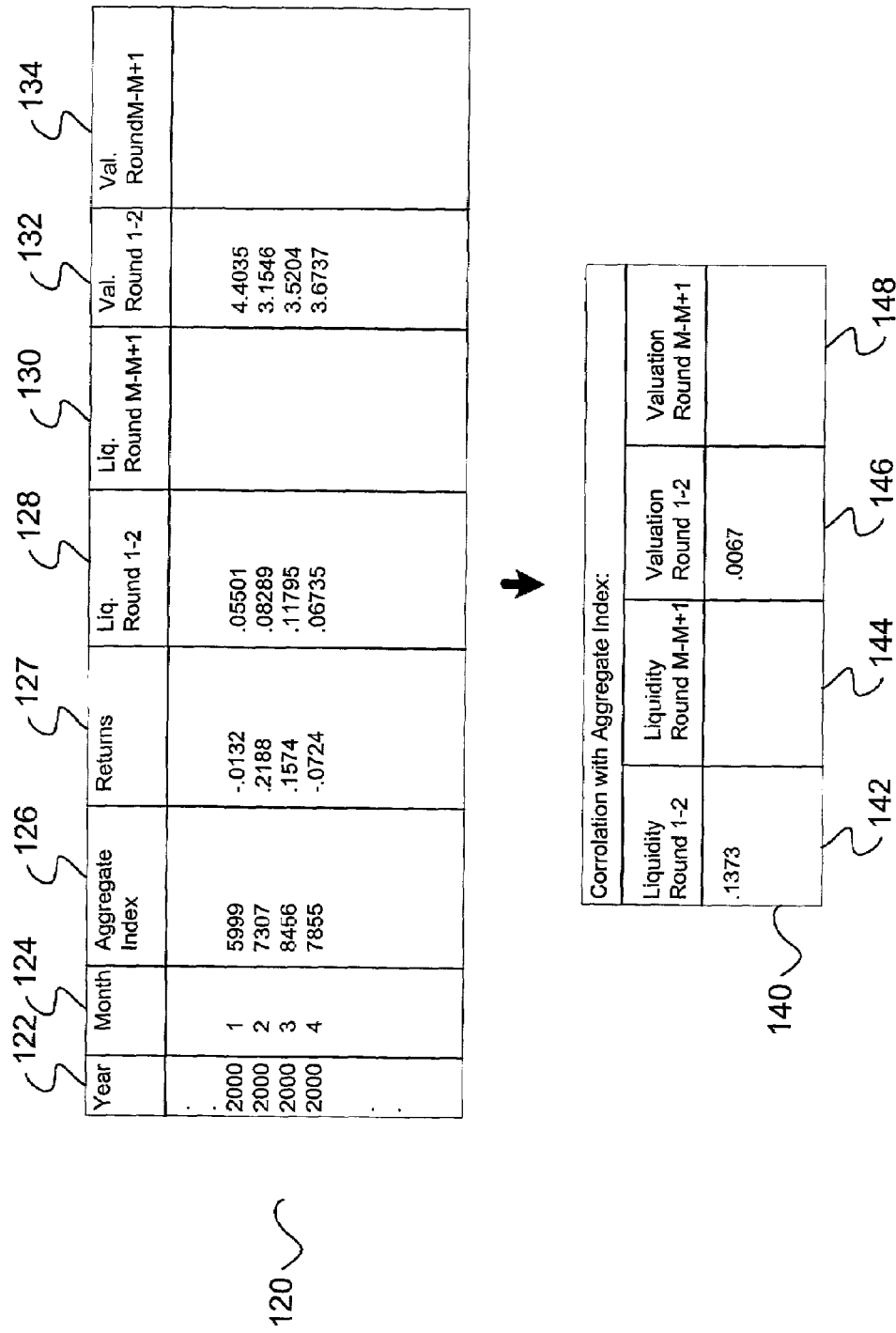
FIG. 5 is a flow-diagram illustrating a determination of a relationship between indices and private equity investment returns.

Referring to FIG. 5, to determine valuation formula parameters, a procedure can build an "aggregate index" 126 that reflects the overall value of all companies in the database at different points in time. The aggregate index may be calculated by first determining the depreciation adjusted values for all investments in a given month. The represents the value of assets at the beginning of a month. Next, the total of the depreciated values for all investments is increased by the amount of any new investments ("amount" 72 of FIG. 4) and the decreased by the value of investments that exit. This total represents the value of all investments held at the end of any given month. Based on these values, a return 127 series of the percentage change in value be can be computed as (end of the month value)/(beginning of the month value). Finally, an aggregate index 126 is created by starting the index value at some value (e.g., 100) in a first period and applying the return values for each month.

Next, an ordinary-least-squares regression is performed using the return series 127 as the dependent variable, with the liquidity and valuation indices of a previous month as independent variables. The independent variables may also include a time-series of returns of one or more public indices such as the NASDAQ.

The regression can indicate the degree that prior information about these indices can be used to forecast future returns. The resulting parameters are the "beta coefficients" 142-148 and quantify the significance of index 128-134 values. Thus, a valuation of a private equity investment can be computed as:

Valuation=(Prior Valuation)*(Depreciation Value)*[1+
$\Sigma(\beta_{liquidity\ M-M+1}$*Liquidity Index Value$_{M-M+1,t}$)+
$\Sigma(\beta_{valuation\ M-M+1}$*Valuation Index Value$_{M-M+1,t}$)].

The terms of other valuations may use feature similar parameters and terms or may incorporate other information. After determining valuations, a program can aggregate all of these current valuations into a new version of an aggregate index.

Figure 6:
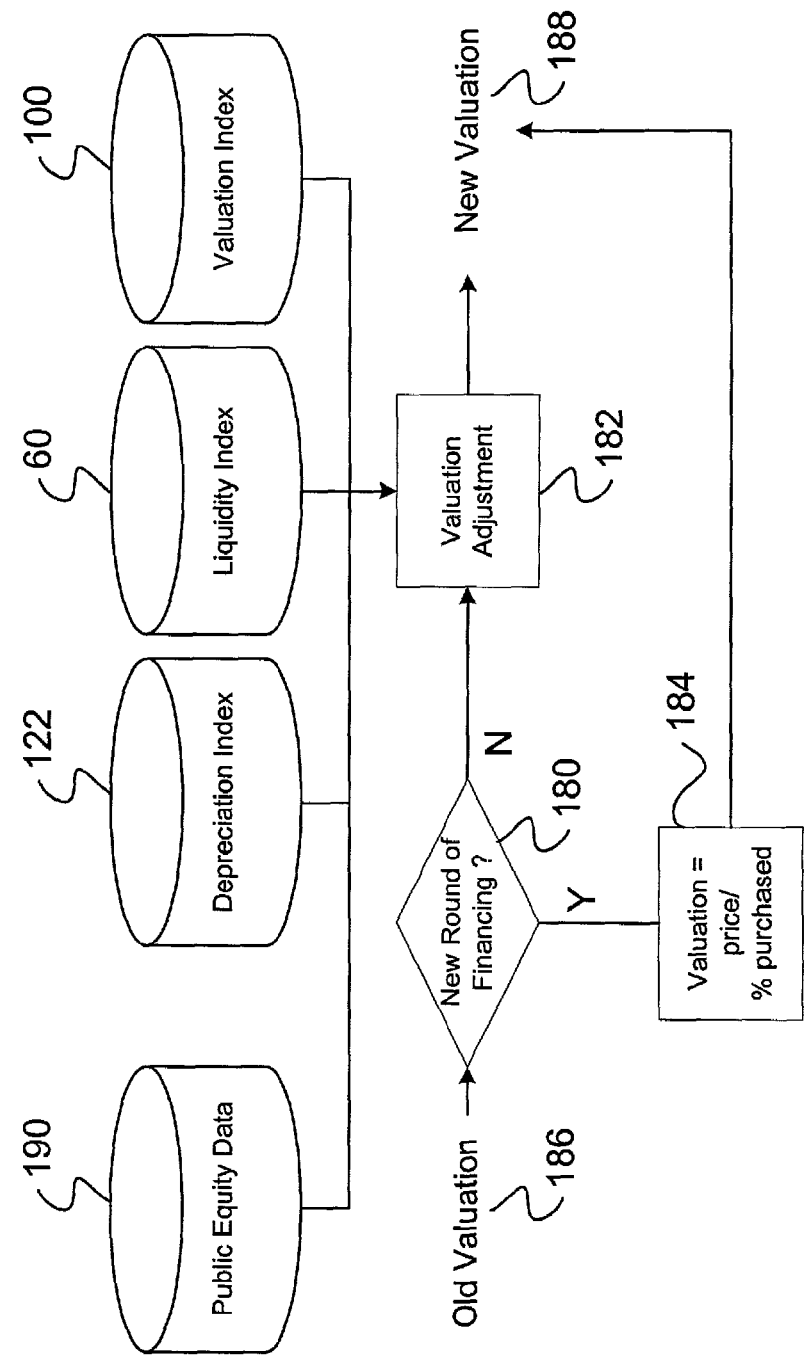
FIG. 6 is a flow-diagram illustrating analysis of a private equity investment.

FIG. 6 illustrates a valuation process that adjusts an old valuation 186 of a private equity investment to a new valuation 188. As shown, the process may adjust the old valuation based on the performance of private equity data 190 such as a benchmark of comparable private equity companies. Thereafter, a formula, such as a formula accessing the depreciation, liquidity, and valuation indices, may be applied if a round of financing did not occur in the present period. If such financing did occur 180 the new valuation 188 can be computed as (transaction price)/(% purchased) 184.

The above described a sample implementation. implementations may proceed differently. For example, other implementations may build indices separately, for example, by industry, geography, or performance. For instance, it is generally accepted that liquidity cycles are industry specific; e.g., in late 2000, there is not much liquidity for business-to-consumer Internet companies, but there is substantial liquidity for medical technologies. Similarly, other implementations may use these industry-specific measures instead of the market wide measures illustrated above.

The indices may also be built over shorter or different horizons. For example, the liquidity and valuation indices described may use a ratio of current liquidity (or valuation) to liquidity over an 18-month period ending six months prior or some other time periods.

V. Missing Data

In practice, data sources often have a substantial amount of missing data items. That is, even if all transactions are included in the database, some information may be missing about some aspects of some of the transactions. If the missing data is not representative of the data that are available, then the missing data may induce biases in the procedures described above. To measure the impact of missing data and to adjust for potential biases, the pattern of missing data can be analyzed. For example, in Venture One Corporation's database of financial transactions, data coverage is much better for "amount raised" (90% available) than for "post-money valuation" (59% available). If this data is missing randomly, then ignoring these investments in the analysis would not induce a bias. If, on the other hand, investments with missing data for post-money valuation are different from the firms that actually have data on post-money valuation, then ignoring the former category of firms would mean that the remaining set of firms would not be representative of all investments.

Statistical analysis of the relationship between data missing and the eventual success of an investment can identify a potential bias. Since most successful exits are through IPOs, a test for whether missing data is correlated with IPO outcomes can serve as a proxy for the severity of the bias that would be induced by missing data. Thus, a regression is run with a value 1 equal to 1 if the investment eventually completed an IPO, and a value of 0 otherwise. Dependent variables include the availability of post-money valuation data for either the first-round (equal to 1 if data is available and equal to 0 if it is missing) or the second round (equal to 1 if data is available and equal to 0 if it is missing). The regression uses a limited time interval of data to allow for enough time to lapse after this round of financing so the firm could have a reasonable chance to have completed an IPO.

Results of this regression strongly indicate that missing data is correlated with IPO outcomes. This means that firms without missing data are more likely to eventually have an IPO. This missing data pattern could have occurred if the data provider successively filled in old rounds of financing after later IPO success had been assured. In any event, it argues for development of procedures to handle missing data.

To remedy a missing-data problem, a procedure can be developed to estimate the missing data based on historical transactions. For example, an estimate of post-money valuation data can be determined using investment-specific information about the "amount raised" in a financing round combined with sample averages about the relationship between amount raised and post-money valuation. For instance, for transactions with no missing data, a variable can track the amount raised divided by post-money valuation. This fraction is remarkably stable and is not significantly correlated with the eventual IPO success of a company. Therefore, a bias in our estimates of post-money valuation would not be introduced if a procedure computes post-money valuation as amount raised divided by the sample-average. Once these estimated post-money valuations have been added to the sample, the resulting augmented sample should not suffer from any biases induced by missing data on post-money valuations.

VI. Applications

These techniques described herein have broad applicability beyond valuing a private equity investment. For example, the aggregate index (126 of FIG. 5) can roughly correspond to overall returns earned by the venture capital industry. For investors in managed funds, however, these are not the returns that they would receive. Rather, they would first need to pay management fees and a profit percentage ("carried interest") to the managers of the private equity funds. In order to more accurately reflect the returns that would be earned by these investors, a procedure can compute an estimate of the fees and carried interest that would be deducted from the overall index.

Since it is impractical to exactly assign each investment to the respective venture capital funds that initiated them, a procedure can determine an approximation of fees and carried interest based on the aggregation of all investments within each calendar year into a series of "hypothetical funds". That is, the procedure can group all investments initiated in 1987 as though they were made by a single hypothetical fund, all investments initiated in 1988 as though they were made by another hypothetical fund, etc. . . . Then, for each of these hypothetical funds, the procedure can compute management fees (e.g., 2%) and carried interest (e.g., 20%) according to standard industry practice.

To compute the fees and carried interest on these hypothetical funds, the procedure can compute the total amount invested in each hypothetical fund by summing the totals in the "amount" raised (72 of FIG. 5) for investments made in each year. This total is the "committed capital" of that hypothetical fund. For each hypothetical fund, a monthly fee of $1/12$ of 2% of this committed capital.

To compute carried interest, a procedure can keep a cumulative running total of the returned capital for each hypothetical fund. Once this cumulative total exceeds the committed capital, then the hypothetical fund is making profits and a fraction of these profits would be returned to the fund managers. In this case, the procedure can return 20 percent of all profits earned in each subsequent period. The sum of all of these fees and carried interest across is then subtracted from the value of the overall index in each month.

The techniques described herein can also be integrated into a wide variety of applications. For example, the techniques can be used to build an aggregate index of marked-to-market returns to private equity, venture capital, or sub-indices by round, industry, or geographic focus. The techniques may also be used to mark-to-market the portfolio of a given private equity fund or funds on a periodic basis.

The techniques may also be used to determine the risk of a group of private equity investments (e.g., investments in a fund) based on a series of returns. For example, let $R_{i,1}$ be the marked-to-market returns earned by Fund i in each period t. Then, a procedure can estimate the regression:

$$R_{i,t} - R_{f,t} = \alpha_i + \beta_{i,1} RMRF_t + \beta_{i,2} SMB_t + \beta_{i,3} HML_t + \beta_{i,4} PR1_t + \epsilon_{i,t}$$

where $R_{f,t}$ is the risk-free return in month t, and $RMRF_t$ is the month t value-weighted market return minus the risk-free rate. The terms $SMB_t$ (small minus big), $HML_t$ (high minus low), and $PR1_t$ (previous one-year return) are the month t returns to zero-investment factor-mimicking portfolios designed to capture size, book-to-market, and momentum effects, respectively. For details on the construction of the factors, see Fama and French (1993) and Carhart (1997). The "risk loading" of this series relative to each benchmark is then assessed as the beta coefficients on the respective factor. For example, the market (RMRF) risk of this series is the estimated coefficient $\beta_{i,1}$. Such a regression analysis can be used to assess the performance for a fund featuring multiple private equity investments. Performance relative to any set of benchmarks is defined as the intercept term from a factor regression. In the example given above, performance relative to the benchmarks would be estimated as the $\alpha_t$(="alpha") from this regression.

A return series can also be used to compute return covariances between funds and between a fund and an index, or between a fund and a factor (e.g., the factors used on the right hand side). Using standard financial practices, these covariances can then be used to compute mean-variance efficient portfolios of funds, private indices, and public indices.

Resulting fund performance and risk measures can be used to select limited partnership investments in funds. For example, an investor can choose funds with the highest past alphas. Alternatively, for example, an investor can choose a set of funds which, when combined with public and private indices, has the highest ratio of expected return to expected variance, where expected returns, variances, and covariances. This investment selection can be done for individual funds or aggregated into a "fund-of-funds" investment vehicle.

The above can also be used to hedge the risk of private equity investments using investment strategies with factor loadings ("betas") opposite in sign to the factor loadings. The strategies can be done for individual funds or aggregated into a "hedge fund" investment vehicle.

Additionally, the factor loadings of specific private equity funds, as in standard financial practice, can be used to compute the appropriate discount rate for the cash flows of this specific fund, a portfolio of funds, or a securitized product based on one or more private equity funds. This discount rate can be used as an input to compute the present discounted value of future profits to this fund or set of funds. This present discounted value can be used as an input in the valuation of private equity firms.

VII. Implementation

The techniques described herein are not limited to any particular hardware or software configuration; they may find applicability in any computing or processing environment. Preferably, the techniques are implemented in computer programs executing on programmable computers that each include a processor, a storage medium readable by the processor (including volatile and non-volatile memory and/or storage elements), at least one input device, and one or more output devices.

Each program is preferably implemented in high level procedural or object oriented programming language to communicate with a computer system. However, the programs can be implemented in assembly or machine language, if desired. In any case the language may be compiled or interpreted language.

Each such computer program is preferably stored on a storage medium or device (e.g., CD-ROM, hard disk, or magnetic disk) that is readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A computer program product, disposed on a computer readable medium, for analyzing at least one private equity investment, the program comprising instructions for causing a processor to:
   access public equity data identifying performance of a set of more than one public equities;
   access private equity data comprising a depreciation index, a liquidity index, and a valuation index; and
   analyze a private equity investment based, at least in part, on the public equity data and the private equity data.

2. The program of claim 1, wherein the instructions that analyze comprise instructions that determine a value of a private equity investment between financing rounds.

3. The program of claim 1, wherein the instructions that access data comprise instructions that access a depreciation value for a private equity investment based on a period time of time after a financing round.

4. The program of claim 3, wherein the instructions that determine a depreciation value comprise instructions that retrieve the value from an index of values for different financing rounds and time periods.

5. The program of claim 4, further comprising instructions that create the index.

6. The program of claim 5, wherein the instructions that create the index comprise instructions that determine a probability of advancing to a next round of financing for a given month.

7. The program of claim 1, wherein the instructions that access private equity data comprise instructions that access a value derived, at least in part, from a comparison of a number of private equity investments advancing to one or more specified financing rounds in a first time period to a number of private equity investments advancing to one or more specified financing rounds in a second time period.

8. The program of claim 7, wherein the instructions that access the value comprise instructions that retrieve the value from an index of values for different financing rounds and time periods.

9. The program of claim 8, further comprising instructions that create the index.

10. The program of claim 8, wherein the instructions that create the index comprise instructions that create the index from a historical distribution of financing rounds reached in different time periods.

11. The program of claim 1, wherein the instructions that access private equity data comprise instructions that access a value derived, at least in part, from data specifying a first valuation for a private equity investment and data specifying a second, different valuation of the private equity investment.

12. The program of claim 11, wherein the instructions that access the value comprise instructions that retrieve the value from an index.

13. The program of claim 12, further comprising instructions that create the index.

14. The program of claim 1, wherein the instructions that analyze comprise instructions that build an aggregate index of private equity investment values.

15. The program of claim 1, wherein the instructions that analyze comprise instructions that analyze a group of private equity investments in a fund.

16. The program of claim 1, wherein the instructions that analyze comprise instructions that determine a risk of a group of private equity investments.

17. The program of claim 16, wherein the instructions that analyze comprise instructions that select private equity investments for inclusion in a fund based on the determined risk.

18. The program of claim 16, further comprising instructions that hedge a group of investments including private equity investments based on the determined risk.

19. A computer program product, disposed on a computer readable medium, for analyzing at least one private equity investment, the program comprising instructions for causing a processor to:
   access public equity data identifying performance of a set of more than one public equities;
   access private equity data comprising a first group of private equity investments, an index and a second group of private equity investments; and
   analyze a private equity investment based, at least in part, on the public equity data and the private equity data, comprising instructions that determine a covariance between the first group of private equity investments and the index or the second group of private equity investments.

20. The program of claim 19, wherein the instructions that access private equity data comprise instructions that access a depreciation index, a liquidity index, and a valuation index.

21. The program of claim 19, wherein the instructions that analyze further comprise instructions that determine a value of a private equity investment between financing rounds.

22. The program of claim 19, wherein the instructions that access data comprise instructions that access a depreciation value for a private equity investment based on a period time of time after a financing round.

23. The program of claim 22, wherein the instructions that determine a depreciation value comprise instructions that retrieve the value from an index of values for different financing rounds and time periods.

24. The program of claim 23, further comprising instructions that create the index.

25. The program of claim 24, wherein the instructions that create the index comprise instructions that determine a probability of advancing to a next round of financing for a given month.

26. The program of claim 19, wherein the instructions that access private equity data comprise instructions that access a value derived, at least in part, from a comparison of a number of private equity investments advancing to one or more specified financing rounds in a first time period to a number of private equity investments advancing to one or more specified financing rounds in a second time period.

27. The program of claim 26, wherein the instructions that access the value comprise instructions that retrieve the value from an index of values for different financing rounds and time periods.

28. The program of claim 27, further comprising instructions that create the index.

29. The program of claim 27, wherein the instructions that create the index comprise instructions that create the index from a historical distribution of financing rounds reached in different time periods.

30. The program of claim 19, wherein the instructions that access private equity data comprise instructions that access a value derived, at least in part, from data specifying a first valuation for a private equity investment and data specifying a second, different valuation of the private equity investment.

31. The program of claim 30, wherein the instructions that access the value comprise instructions that retrieve the value from an index.

32. The program of claim 31, further comprising instructions that create the index.

33. The program of claim 19, wherein the instructions that analyze comprise instructions that build an aggregate index of private equity investment values.

34. The program of claim 19, wherein the instructions that analyze comprise instructions that analyze a group of private equity investments in a fund.

35. The program of claim 19, wherein the instructions that analyze comprise instructions that determine a risk of a group of private equity investments.

36. The program of claim 35, wherein the instructions that analyze comprise instructions that select private equity investments for inclusion in a fund based on the determined risk.

37. The program of claim 35, further comprising instructions that hedge a group of investments including private equity investments based on the determined risk.

* * * * *

UNITED STATES PATENT AND TRADEMARK OFFICE
CERTIFICATE OF CORRECTION

PATENT NO.         : 7,426,488 B1                                    Page 1 of 1
APPLICATION NO.    : 09/990893
DATED              : September 16, 2008
INVENTOR(S)        : Paul A. Gompers et al.

It is certified that error appears in the above-identified patent and that said Letters Patent is hereby corrected as shown below:

Title page item 76
Inventors: should read as follows:

Paul A. Gompers, 156 Mason Ter., Brookline, MA (US) 02446; Joshua Lerner, 108 Moulton St., South Hamilton, MA (US) 01982; Andrew Metrick, 604 Schiller Ave., Merion Station, PA (US) 19066; Leslie An Jeng, 32 River St. Cambridge, MA (US) 02139

Signed and Sealed this

Twenty-fifth Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,426,488 B1 | Page 1 of 1 |
| APPLICATION NO. | : 09/990893 | |
| DATED | : September 16, 2008 | |
| INVENTOR(S) | : Paul A. Gompers et al. | |

It is certified that error appears in the above-identified patent and that said Letters Patent is hereby corrected as shown below:

Title page item 76
Inventors: should read as follows:

Paul A. Gompers, 156 Mason Ter., Brookline, MA (US) 02446; Joshua Lerner, 108 Moulton St., South Hamilton, MA (US) 01982; Andrew Metrick, 604 Schiller Ave., Merion Station, PA (US) 19066; Leslie Ann Jeng, 32 River St. Cambridge, MA (US) 02139

This certificate supersedes the Certificate of Correction issued November 25, 2008.

Signed and Sealed this

Third Day of February, 2009

JOHN DOLL
*Acting Director of the United States Patent and Trademark Office*